March 26, 1963 H. E. VAN HOESEN 3,083,322
FEEDBACK CONTROL CIRCUIT
Filed Oct. 21, 1958 7 Sheets-Sheet 1

INVENTOR.
HAROLD E. VAN HOESEN
BY Harold T. Stowell
Harold L. Stowell
ATTORNEYS

FIG. 4.

INVENTOR.
HAROLD E. VAN HOESEN
BY
ATTORNEYS

March 26, 1963 H. E. VAN HOESEN 3,083,322
FEEDBACK CONTROL CIRCUIT
Filed Oct. 21, 1958 7 Sheets-Sheet 3

FIG. 4.

INVENTOR.
HAROLD E. VAN HOESEN
BY *Harold T. Stowell*
*Harold L. Stowell*
ATTORNEYS

March 26, 1963 H. E. VAN HOESEN 3,083,322
FEEDBACK CONTROL CIRCUIT
Filed Oct. 21, 1958 7 Sheets-Sheet 4

INVENTOR.
HAROLD E. VAN HOESEN
BY Harold T. Stowell
Harold L. Stowell
ATTORNEYS March 26, 1963  H. E. VAN HOESEN  3,083,322

FEEDBACK CONTROL CIRCUIT

Filed Oct. 21, 1958 7 Sheets-Sheet 6

INVENTOR.
HAROLD E. VAN HOESEN

BY *Harold T. Stowell*
*Harold L. Stowell*

ATTORNEYS

March 26, 1963  H. E. VAN HOESEN  3,083,322
FEEDBACK CONTROL CIRCUIT
Filed Oct. 21, 1958  7 Sheets-Sheet 7

INVENTOR.
HAROLD E. VAN HOESEN
BY Harold T. Stowell
Harold L. Stowell
ATTORNEYS 3,083,322
FEEDBACK CONTROL CIRCUIT
Harold E. Van Hoesen, Somerville, N.J., assignor to Research-Cottrell, Inc., Bridgewater Township, N.J., a corporation of New Jersey
Filed Oct. 21, 1958, Ser. No. 768,693
10 Claims. (Cl. 318—28)

The present invention relates to improved control circuits and particularly to driving circuits employing saturable core transformers. More specifically the circuit employs a saturable core transformer wherein a control signal, responsive to a parameter being sensed, is applied to the control winding thereof to so effect the saturation of the core that the current flow in the output winding of the transformer during one half cycle is a function of the current flow in the control winding during the preceding half cycle.

A principal object of the invention is to produce a control circuit employing stable magnetic and semi-conductor devices.

Another object of the invention is to produce a control circuit for unidirectional voltage regulation.

These and other objects and advantages may be effectively achieved by a control circuit comprising a saturable-core transformer including a core, an output winding in circuit with a load and a control winding, circuit means for connecting a source of alternating potential to the output winding and the control winding, means in the control winding circuit for controlling the current magnitude in said control winding, and rectifier means in said circuit means whereby the current flow in the output winding during one half cycle is determined by the current flow in the control winding during the preceding half cycle.

The invention will be more clearly understood by reading the following detailed description in connection with the attached drawings, in which:

FIG. 2 is a circuit diagram of a magnetic driver circuit embodying the principles of the present invention;

FIG. 17 is a diagrammatic representation of a motor control embodying the control circuit of the invention; and FIG. 18 is a diagrammatic representation of the application of the motor control of FIG. 17 in the automatic control of fluid flow.

Figure 1:
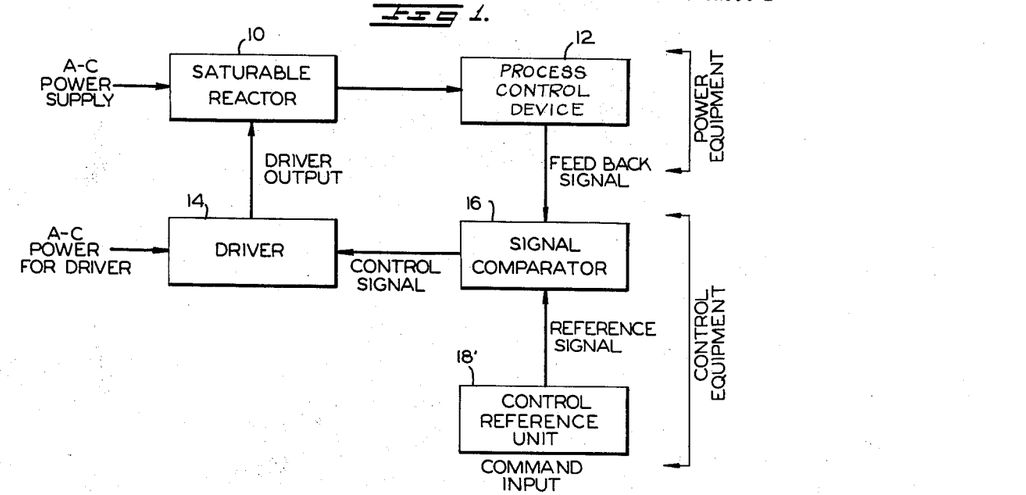
FIG. 1 is a schematic illustration of a typical automatic control system embodying the inventive concepts of the present application.

Referring to FIG. 1, there is illustrated in schematic form the typical orientation of elements in an automatic control system embodying the features of the present invention. A saturable reactor 10 is coupled between a suitable source of alternating potential and a load 12. A magnetic driver 14, shown and described in greater detail with reference to FIG. 2, is connected to a suitable source of alternating potential. The output of the magnetic driver 14, which is adapted to be fed to control the output of the saturable reactor 10, is controlled by the output of a signal comparator 16. The comparator 16 is coupled between the load 12 and a control reference unit 18 and functions to compare a feedback signal taken from the load 12 with the signal output of the control reference unit 18.

It will be appreciated that the saturable reactor 10 and the load 12 comprise the power equipment of the circuit and the magnetic driver 14, the signal comparator 16 and the control reference unit 18 comprise the control equipment of the circuit.

FIG. 1 illustrates general application of the new control and driving circuits for saturable core reactors to a typical automatic control system. Load 12 represents the process or equipment which is to be electrically controlled within defined limits. Alternating current power to the process is regulated by a conventional saturable core reactor 10. Variation of the A.C. flow through the reactor is accomplished by changing the D.C. current supplied to the reactor control winding. The driver 14 provides the D.C. current for reactor saturation in accordance with a low energy control signal received from the signal comparator 16. Power for driver operation is obtained from an A.C. supply. The control signal to the driver 14 can be either A.C. or D.C. as described hereinafter in connection with specific driver circuits.

The process can be automatically controlled by arranging the driver control signal to vary in such a manner as to correct for process deviations from the desired operating point. One method for doing this is to use a control reference 16, and a signal comparator 18, as illustrated. The control reference is preset for the desired operating point of the control parameter. Function of the signal comparator 18 is to provide an error output signal as the control signal for the driver, thus completing the feedback control loop.

Naturally magnitudes, polarities, phase, etc. of the various signals and control currents will depend upon the specific application of the system. Some advantages of such a control system with the driving circuits disclosed are:

(1) Continuous, stepless control action.
(2) Proportional control action whereby magnitude of the corrective action increases with deviation from the desired operating point.
(3) Fast control responses with high circuit efficiency are possible when the new driver circuitry is employed.
(4) This type of system lends itself to static components thus eliminating troublesome electro-mechanical devices and insuring long, trouble-free service.

The simplest form of the magnetic driver embodiment of the invention for controlling a saturable reactor is illustrated in FIG. 2. Though a half wave driver unit is discussed, it must be understood that this method can be extended for full wave output, illustrated and described with reference to FIG. 4, as well as polyphase applications. Operating power for the driver 14 is obtained from an A.C. supply connected thereto at terminals 20 and 22. The control signal for controlling the driver 14 is applied thereto at terminals 24 and 26 in the form of a variable impedance, D.C. current, or A.C. current which is the resultant function of a feedback signal applied to the signal comparator 16 and a reference signal derived from the control reference unit 18. Half wave output from the driver 14 appears at the terminals 28 and 30 and is utilized to energize the control winding 50 of the saturable reactor 10 of the power circuit.

It will be noted that the circuit shown in FIG. 2 comprises a magnetizing transformer 32 having its primary winding connected to the A.C. supply terminals 20 and 22 and its secondary winding connected in series between the control signal input terminal 26 and the control winding of a saturation transformer 34. A rectifier element 36 is connected in series between the control winding of the transformer 34 and the other control signal input terminal 24. The rectifier element 36 is effective to permit the passage of the control or reset current flow only in the direction of the arrow.

The output winding of the saturation transformer 34 and a rectifier element 38 are connected in series between the A.C. supply terminal 20 and the output terminal 28, while the A.C. supply terminal 22 is coupled directly to the output terminal 30 of the driver unit 14. A rectifier element 40 is coupled in the driver circuit across the output terminals 28 and 30 and is provided as a back rectifier in the driver to reduce inverse voltage stresses due to the inductance of the driver load which in this instance is the control winding 50 of the saturable reactor 10. The rectifier element 38 is effective to permit the flow of output current in the secondary circuit of the saturation transformer 34 only in the direction of the arrow shown in the drawing.

The operation of the magnetic driver 14 is dependent upon controlling magnetic flux levels in the core of the saturation transformer 34 by flux resetting currents through the control winding circuit of the transformer 34. To illustrate the condition of minimum driver output, we will assume the core flux in the transformer 34 has been previously set to a point $a$ on the ideal hysteresis curve, shown in FIG. 3. During the positive half cycle of the supply voltage sensed across terminals 20 and 22, current is allowed to flow in the output circuit of the transformer 34; however, the current flow in the control circuit of the transformer 34 induced by the transformer action of the transformer 32 is blocked by the action of the rectifier 36. As supply voltage $V_1$ rises, the core flux of the transformer 34 will traverse points $a$, $b$, $c$, $d$, to $e$ in sequence during the positive half cycle. Since the core flux has remained below point $d'$ of the hysteresis curve, most of the supply voltage will appear across the output winding of the transformer 34 in opposition to the counter E.M.F. caused by the core flux change and a negligible voltage will appear across the load resulting in minimum driver output.

On the following negative half cycle of the A.C. supply source which is sensed across terminals 20 and 22, the current flow through the load 50 is blocked by the rectifier 38 since the current flow is in a direction opposite to that in the preceding positive half cycle. During this half cycle of the supply potential, the voltage in the output circuit of the transformer 34 is partially cancelled by the induced voltage from the reset current flow in the control circuit of the transformer 34. The remainder of the supply voltage; that is, that portion which has not been cancelled by the effect of the reset current, will appear across the rectifier 38, again with negligible voltage appearing across the load winding 50. It will also be apparent that during the negative half cycle, the core flux in the saturation transformer 34 will return to point $a$ through points $e$, $f$, $g$ and $h$ of the curve illustrated in FIG. 3, thereby allowing reset current to flow in the control winding circuit of the transformer 34.

Figure 3:
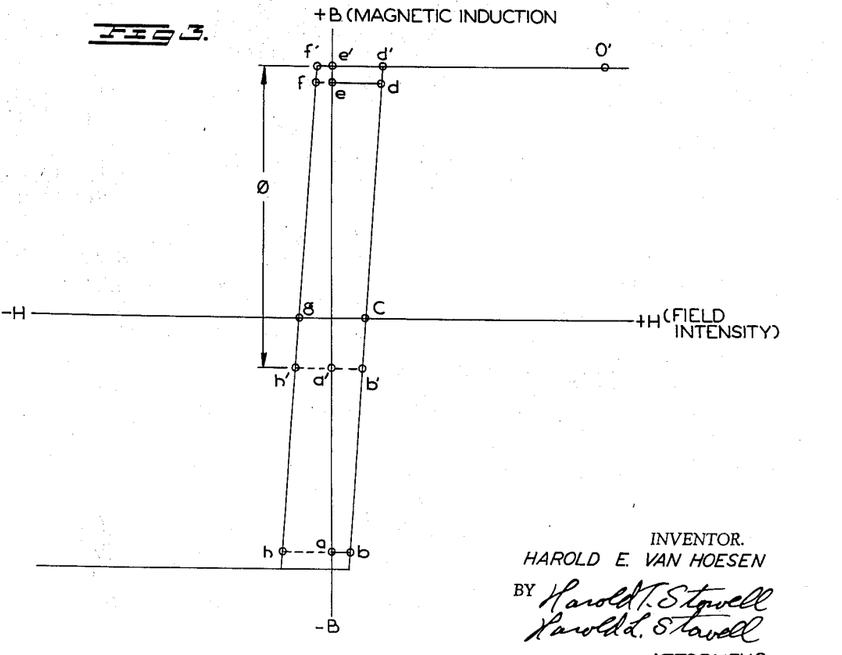
FIG. 3 is a graphic illustration of the magnetic operation of the core in the saturation transformer of FIG. 2.

The magnitude of the reset or control current is governed by values of the reset voltage $V_2$ which appears across the secondary winding of the magnetizing transformer 32 and the control circuit impedance or the control voltage between points 24 and 26. Of course, it will be appreciated that the above described process or cycle of operation is repeated on succeeding cycles.

To obtain an intermediate output from the driver 14, assume the core flux of the transformer 34 has not been fully reset and is at $a'$ of FIG. 3 rather than at point $a$. As the supply voltage across the terminals 20 and 22 rises, the core flux of the saturation transformer 34 will now traverse points $a'$, $b'$, $c$, $d$, $d'$ $o'$, $d'$ to $e'$. When the core flux exceeds point $d'$, the rate of change of core flux ceases and the counter E.M.F. of the output winding of the saturation transformer 34 no longer opposes the remainder of the supply voltage pulse. This remaining portion of the supply voltage appears across the load (the control winding 50 of the saturable reactor 10), as the driver output. Output to the load occurs during the period when the core flux traverses point $d'$, $o'$, $d'$ to $e'$. During the negative supply half cycle, the core flux of the saturation transformer 34 is reset through points $e'$, $f'$, $g$, $h'$, to $a'$ by the control current which is supplied to the control input terminals 24 and 26. Full flux resetting to point $a$ is prevented by either increasing the impedance of the control circuit or reducing the value of the reset voltage $V_2$ from magnetizing transformer 32. As mentioned hereinabove, the diode rectifier 40 is provided as a back rectifier in the driver circuit to reduce inverse voltage stresses due to the inductance of the driver load which as mentioned before is the control winding 50 of the saturable reactor 10.

The method of operation described above makes it possible to obtain a variable output pulse in accordance with the control signal input which in operation is similar to that which will be described hereinafter with reference to the phase controlled thyratron circuits. Further, it will be appreciated that the maximum output from the driver 14 occurs with no reset current, and minimum output occurs with full reset current. Furthermore, it will be apparent that the driver 14 will respond in the following half cycle to a control command setting the initial flux level in the core of the saturation transformer 34 in the preceding half cycle.

Figure 4:
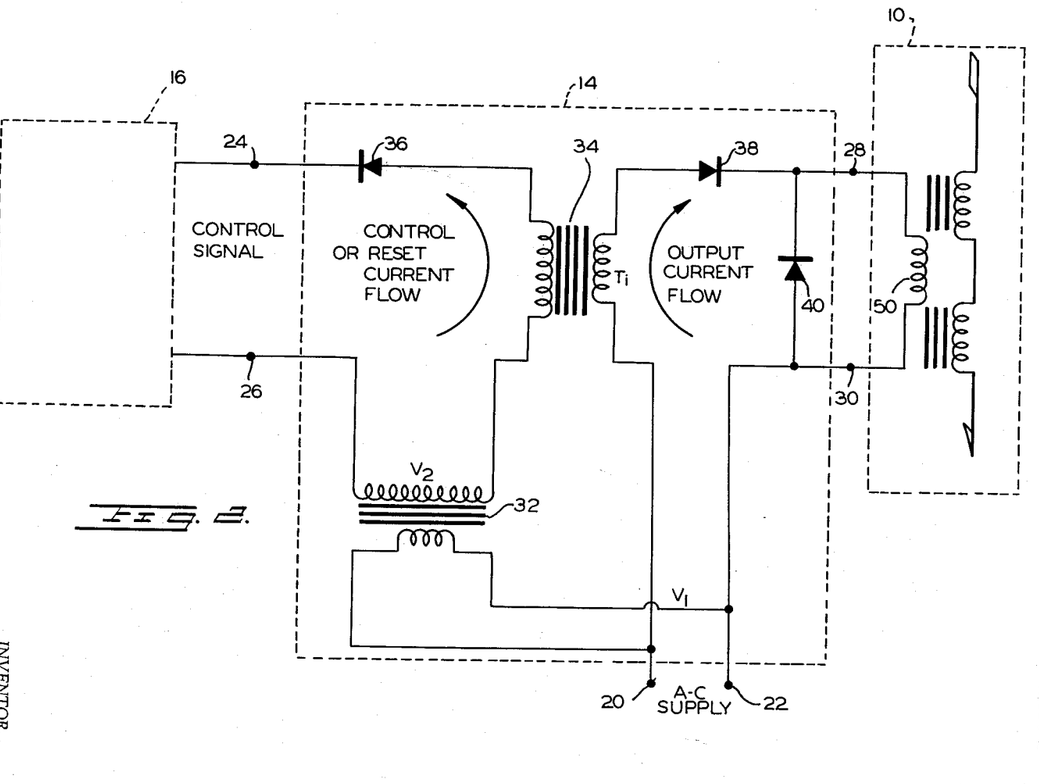
FIG. 4 is a circuit diagram of a magnetic driver circuit adapted for full wave output.

The embodiment of the invention illustrated in FIG. 4 shows a circuit arrangement employing the principal features of the circuit illustrated in FIG. 2 and is adapted for full-wave output. The circuit comprises a magnetizing transformer 60 having its primary winding connected to the A.C. supply terminals 62 and 64. One side of the secondary winding of the transformer 60 is connected between a pair of series connected rectifier elements 76 and 78 while the ohter side of the secondary winding is connected between the control windings of a pair of series connected saturation transformers 70 and 74. The opposite sides of the control windings of the saturation transformers 70 and 74 are connected to the control signal input terminals 66 and 68 respectively through respective rectifier elements 72 and 80.

The A.C. supply terminals 62 and 64 are also connected into the load circuit which includes the output windings of the saturation transformers 70 and 74, rectifier elements 82 and 84 and the output terminals 90 and 92 which are all connected in series. The load circuit also includes a pair of series connected rectifier elements 86 and 88 which are connected across the load 94 having one side of the rectifier 86 connected between the rectifier 82 and the output terminal 90 and the opposite side of the rectifier 88 connected between the rectifier 84 and the output terminal 92. The load 94 is a control winding of the saturable reactor 10. One of the A.C. supply terminals 62 is connected at a point between the output windings of the transformers 70 and 74 while the other supply terminal 64 is connected between rectifier elements 86 and 88.

The operational features of the circuit shown in FIG. 4 are identical with that described in connection with FIG. 2 except that the output of the driver 14 which appears at the terminals 90 and 92 is full wave and as in the previous embodiment the output is employed to energize the control winding 94 of the saturable reactor of the power circuit.

The embodiments of the invention illustrated in FIGS. 5–17 show various thyratron tube control circuits which comprise a saturable core transformer having a control winding and an output winding, rectifier means in series-connected circuit with the output winding, with the control grid of the thyratron tube and with a source of alternating voltage synchronous with the alternating current supply to the thyratron tube, a grid-controlled amplifier tube having the control winding and a source of alternating voltage synchronous with the alternating current supply to the thyratron tube in series-connected circuit with the anode and cathode thereof, the polarity of the circuit including the control winding being opposite to the polarity of the circuit including the output winding whereby current is supplied to said windings alternately in successive half-cycles of the alternating current supply to magnetize the core of the transformer in opposite directions in successive half-cycles, and means for impressing a direct current signal voltage on the grid of the tube in circuit with the control winding whereby the voltage pulse produced in the circuit including the output winding in each alternate half-cycle is phase shifted in such half-cycle in response to variations in the direct voltage signal impressed on the grid of the amplifier tube in the preceding half-cycle.

The grid-controlled amplifier tube in circuit with the control winding of the saturable transformer provides the functions of rectification, variable impedance, amplification and isolation of the circuit. The amplifier tube may be a triode, tetrode, pentode or other multi-element vacuum tube depending on the requirements of any particular application and various circuit elements may be incorporated in the grid and anode-cathode circuits to modify their characteristics for particular purposes.

Figure 5:
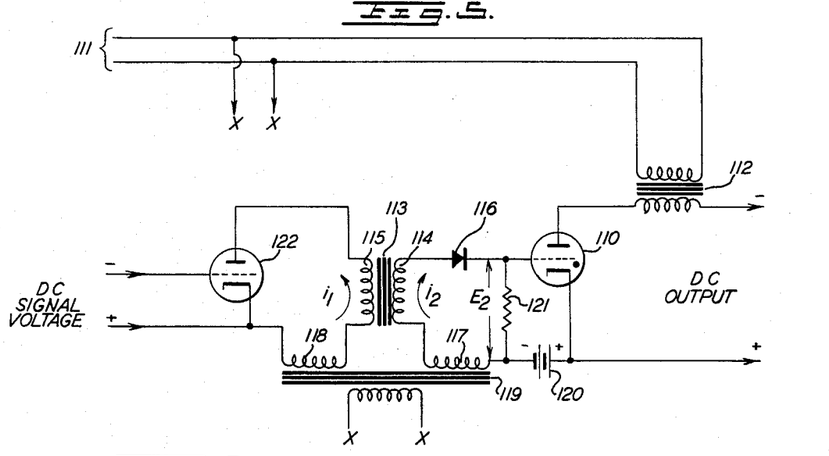
FIG. 5 is a diagrammatic representation of a modification of the control circuit of the invention.

In the control circuit shown in FIG. 5, the output of thyratron tube 110, energized by A.C. supply line 111 through transformer 112 is varied by a phase-shifted trigger pulse in the grid circuit of the rectifier, the timing of which is governened by the magnetic flux resetting in saturable core transformer 113, having an output winding 114 and a control winding 115. The output winding 114 is connected in series with the grid of the thyratron tube 110 through diode rectifier 116 and with winding 117 of transformer 119 which is energized from A.C. supply line 111. A fixed bias supply 120 and a grid resistor 121 are included in the grid circuit. The control winding 115 is connected in series with winding 118 of transformer 119 and with the anode and cathode of a grid-controlled amplifier tube 122 at a polarity opposite to the polarity of the output winding circuit whereby core setting currents $i_1$ and $i_2$ are provided in alternate half-cycles of the A.C. current. As the D.C. signal voltage applied to the grid of tube 122 changes, reset current $i_1$ varies and changes the initial flux level in the core for the following voltage pulse from transformer 119. If the core of transformer 113 is highly saturated by pulse $i_1$ the following voltage pulse is completely absorbed in 113 and no trigger voltage $E_2$ appears across resistor 121. Smaller values of $i_1$ result in less saturation of the core of transformer 113 and a portion of the following voltage pulse appears as trigger pulse $E_2$. The time of appearance of trigger voltage $E_2$ with respect to the A.C. supply voltage is determined by the value of reset current pulse $i_1$. This trigger pulse $E_2$ is phase shifted in accordance with the value of the D.C. signal voltage applied to the grid of tube 122 and thus by varying the signal voltage the conduction period of tube 110 can be varied to give an average D.C. output ranging from zero to the maximum.

Figure 6:
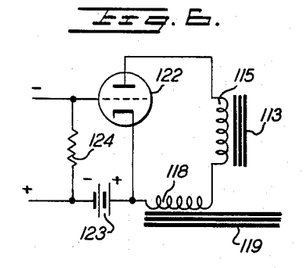
FIGS. 6, 7, 8 and 9 are partial diagrammatic representation of various grid bias arrangements of the control winding circuit illustrated in FIG. 5.

In the modification of FIG. 6 a fixed bias grid circuit is provided for tube 122 by bias supply 123 and grid resistor 124.

Figure 7:
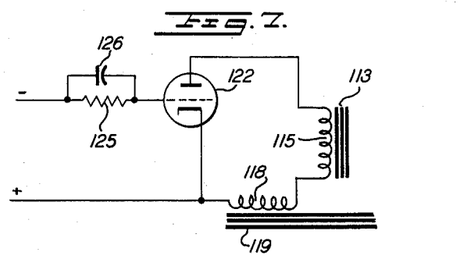

In the modification of FIG. 7 a grid leak bias is provided by grid leak resistor 125 and capacitor 126.

Figure 8:
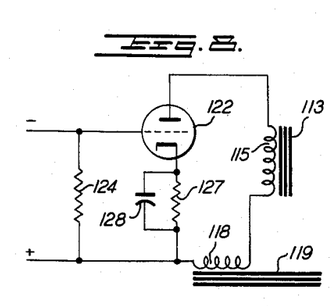
Figure 9:
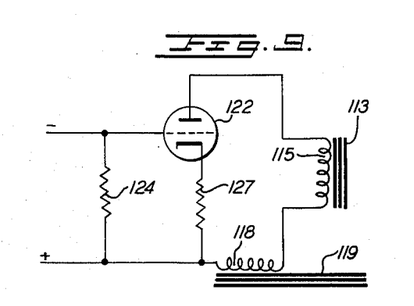

A self bias circuit is provided in the modification of FIG. 8 by cathode resistor 127, capacitor 128 and grid resistor 124, while the cathode resistor 127 and grid resistor 124 of the form shown in FIG. 9 provides a degenerative bias circuit.

Figure 10:
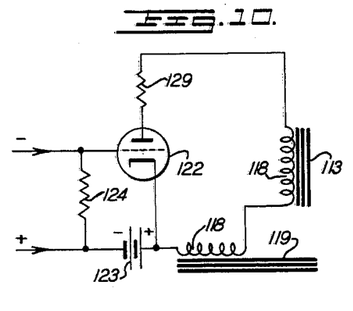
FIG. 10 is a partial diagrammatic representation showing the use of a plate resistor to vary the characteristics of the control circuit.

The circuit of FIG. 10 illustrates the use of a plate resistor 129 to vary the shape of the control characteristic.

Figure 11:
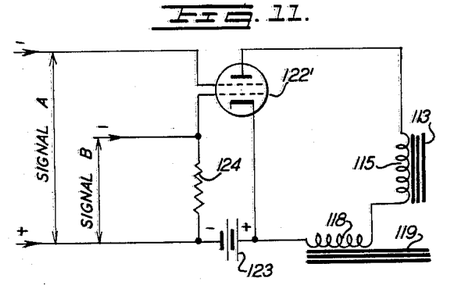
FIG. 11 is a partial diagrammatic representation showing the use of a multi-grid tube for control with multiple signals.

FIG. 11 illustrates the use of a multi-grid amplifier tube 122' with multiple control signal input.

Figure 12:
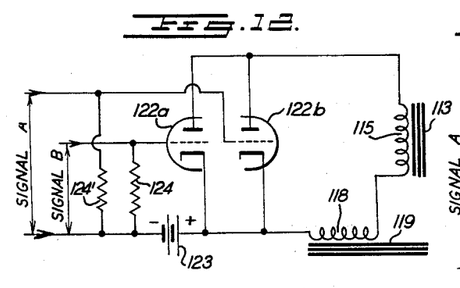
FIG. 12 is a partial diagrammatic representation showing a parallel dual triode for control with dual signals.
Figures 12, 13:
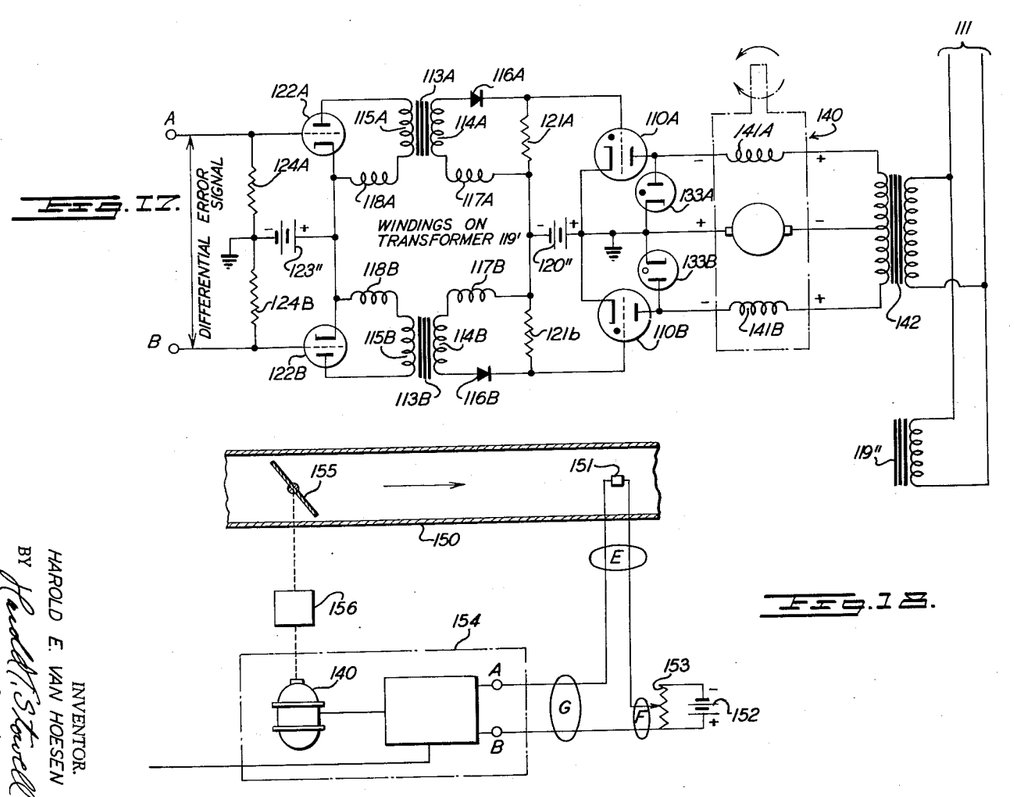
FIG. 13 is a partial diagrammatic representation showing a dual triode cascade circuit for control with dual signals.
Figure 13:
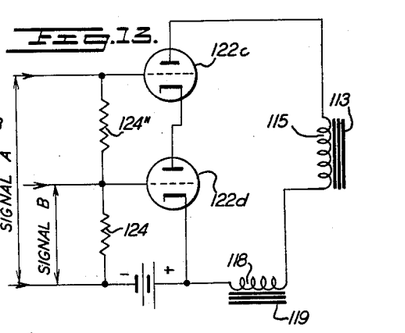

Multiple control signal input with a dual triode tube 122a, 122b in parallel is shown in FIG. 12, and multiple control signal input with two triodes 122c 122d in cascade is shown in FIG. 13.

Figure 14:
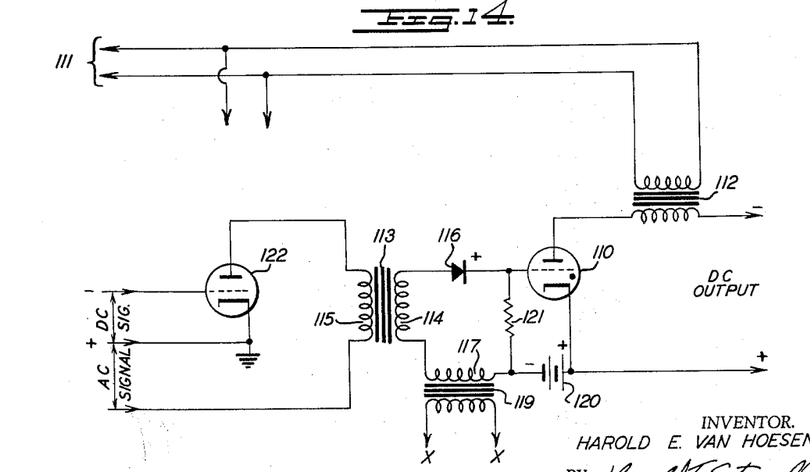
FIG. 14 is a diagrammatic representation of a modification of the invention for control for both D.C. and A.C. signals.

FIG. 14 shows a modified circuit providing both D.C. and A.C. signal input. In this circuit the A.C. signal must be synchronous in frequency and in phase with the A.C. supply current 111.

Figure 15:
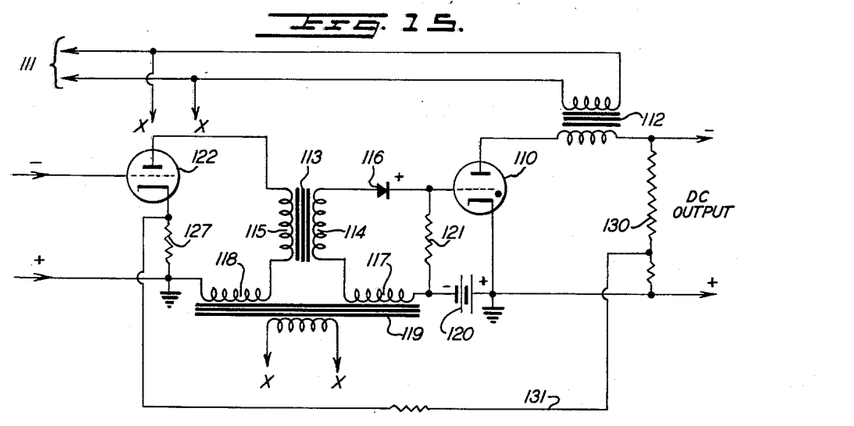
FIG. 15 is a diagrammatic representation of the control circuit of the invention modified to produce negative feedback from the output of the rectifier to the control circuit.

The arrangement shown in FIG. 15 illustrates the incorporation of feedback circuits into the control circuit of the invention. In the form shown in the figure a small amount of negative voltage from the output is returned by means of voltage divider 130 and line 131 to the cathode circuit of tube 122 in opposition to the signal voltage. The negative feedback provides increased stability and linearity of operation at the expense of overall gain. Small amounts of positive feedback may be used to provide increased sensitvity or oscillation if desired.

The various forms of the control circuit of the invention may be readily applied to full-wave thyratron rectifier circuits as well as to the half-wave circuits illustrated for simplicity. Such full-wave circuits are desirable where more power output or less ripple in the rectified output is desired.

Figure 16:
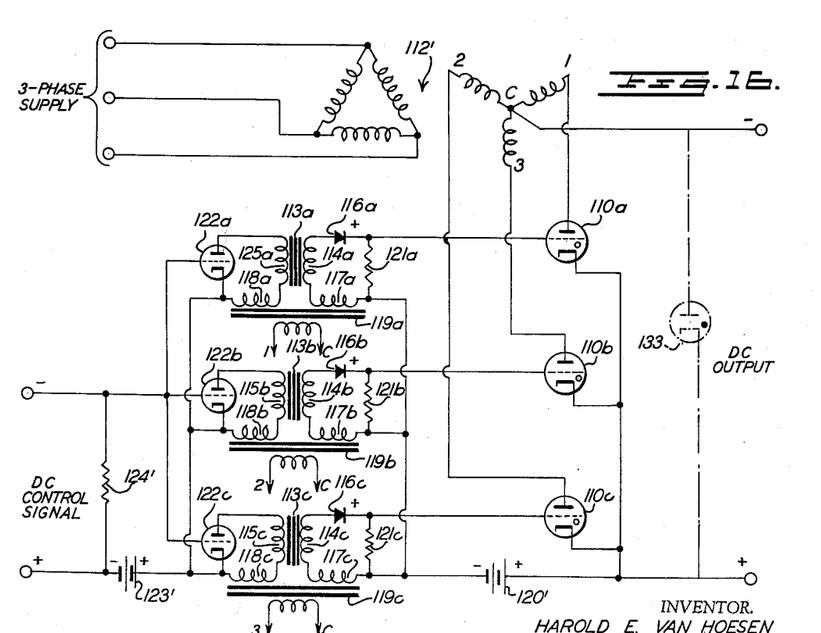
FIG. 16 is a diagrammatic representation of a high-gain, high-power, D.C. amplifier embodying the control circuit of the invention.

FIG. 16 illustrates the application of the control circuit of the invention in a high power amplifier which can provide power gains of the order of 10 million. In the arrangement illustrated a bank of thyratrons 110a, 110b, 110c are connected across the individual secondary windings of a three-phase transformer 112', and the grid of each thyratron is connected to a control circuit of the invention energized through transformers 119a, 119b, 119c from the corresponding secondary windings of transformer 112'. A control signal is applied in common to the grids of amplifier tubes 112a, 112b, 122c by a grid circuit including fixed bias 123' and grid resistor 124'. With the arrangement illustrated a signal input of about 0.002 watt can be amplified to approximately 25 kw. output. A damper diode tube 133 is advantageously connected across the output line for inductive loads and its function is to prevent the discharge of inductive energy into the control tubes 110a, 110b, and 110c.

The application of the control circuit of the invention to the operation of servo motors is illustrated in FIGS. 17 and 18. In FIG. 17, 140 is a split field D.C. motor, for example, up to about 8 horsepower, having field windings indicated at 141A and 141B energized from an A.C. supply line through the center-tapped secondary winding of transformer 142 and thyratron tubes 110A and 110B, respectively. The grids of tubes 110A and 110B are connected to control circuits of the invention governed by grid-controlled amplifier tubes 122A and 122B, respectively. The pair of damping diode tubes 133A and 133B are employed to protect the thyratrons 110A and 110B from voltage transients caused by the inductance characteristics of the motor field windings 141A and 141B. A differential error signal is impressed between the grids of tubes 122A and 122B. When the error signal is zero the system is in balance and the motor is stationary. The motor torque is proportional to the magnitude of the error signal and the direction of rotation is determined by the polarity of the error signal thus permitting the control to be used in null seeking servo control systems. For example, in the illustrated arrangements when the error signal is positive at A, the motor rotates counterclockwise as indicated by the arrows and when the error signal is positive at B, the motor rotates clockwise.

An application of the servo control system of FIG. 17 to automatic flow control is diagrammatically illustrated in FIG. 18, wherein 150 is a conduit through which a fluid flows from a variable pressure source, 151 is a flow rate transducer producing across E a D.C. voltage proportional to the flow rate. Voltage source 152 is set by resistor 153 to provide a reference voltage at F which when combined with the signal voltage E provides an error signal G, which is zero at the desired flow rate. Signal G is applied to control signal input terminals A, B of the motor control system of FIG. 17 which is indicated at 154 in FIG. 18. The motor 140 drives valve 155 in conduit 150 through drive mechanism indicated at 156.

The flexibility and wide range of applicability of the control circuit of the invention will be apparent from the foregoing description. It can be used advantageously in automatic fluid flow controls, in automatic rectifier control systems for electrical precipitators as shown, for example, in application Serial No. 625,803, filed December 3, 1956, entitled, Control System for Electrical Precipitators, in variable speed motor drives, in automatic voltage regulation, in aircraft and ship controls and in many other applications which will be apparent to those skilled in the art.

This is a continuation-in-part of my application Serial No. 626,052 filed December 3, 1956, now abandoned.

I claim:

1. In combination with a thyratron tube for converting alternating voltage from an alternating current supply to direct voltage, a grid control circuit including a saturable core transformer having a control winding and a reactor winding, rectifier means in series-connected circuit with said reactor winding, with the grid of the thyratron tube and with a source of alternating voltage synchronous with said alternating current supply, a grid-controlled amplifier tube having said control winding and a source of alternating voltage synchronous with said alternating current supply in series-connected circuit with the anode and cathode thereof, the polarity of the circuit including said control winding being opposite to the polarity of the circuit including said reactor winding whereby current is supplied to said windings alternately in successive half-cycles of said alternating current supply to magnetize the core of said saturable core transformer in opposite directions in successive half-cycles, and means for impressing a direct current control signal on the grid of the tube in circuit with said control winding whereby the voltage pulse produced in the circuit including said reactor winding in each alternate half-cycle is phase shifted in such half-cycle in response to variations in the direct voltage signal impressed on said grid in the preceding half-cycle.

2. A control circuit as defined in claim 1 including circuit elements connected to impress a portion of the output of the thyratron tube upon the cathode circuit of the amplifier tube.

3. A control circuit as defined in claim 1 including circuit elements connected to impress a portion of the output of the thyratron tube upon the cathode circuit of the amplifier tube in opposition to the effect of said direct voltage signal.

4. A control circuit as defined in claim 1 wherein the amplifier tube includes a plurality of control grids whereby a plurality of direct voltage control signals may be impressed on said control winding circuit.

5. A control circuit as defined in claim 1 wherein a plurality of grid-controlled amplifier tubes are connected in parallel with said control winding whereby a plurality of direct voltage control signals may be impressed on said control winding circuit.

6. A control circuit as defined in claim 1 wherein a plurality of grid-controlled amplifier tubes are connected in series with said control winding whereby a plurality of direct voltage control signals may be impressed on said control winding circuit.

7. An amplifier system comprising a 3-phase transformer, the primary windings of which are energized by a 3-phase alternating current supply, a thyratron tube in series with each secondary winding of said 3-phase transformer and with a common output circuit, a grid control circuit associated with each of said thyratron tubes comprising a saturable core transformer having a control winding and a reactor winding, rectifier means in series-connected circuit with said reactor winding, with the grid of said thyratron tube and with a source of alternating voltage synchronous with the corresponding phase of said alternating current supply, a grid-controlled amplifier tube having in series connected circuit with the anode and cathode thereof, said control winding and a source of alternating voltage synchronous with the corresponding phase of said alternating current supply and opposite in polarity to the alternating voltage source in the reactor winding circuit, whereby current is supplied to said windings in successive alternations of the corresponding phase of the alternating current supply alternately in successive alternations of said phase to magnetize the core of said saturable core transformer in opposite directions in successive alternations, and means for impressing a common direct control signal voltage on the grids of each of said amplifier tubes.

8. A servo motor system comprising a direct current motor having paired field coils of an alternating current power source, a thyratron tube in series with each coil of said pair and with a source of alternating current power to energize each coil in alternate half-cycles of the alternating current, a grid control circuit associated with each of said thyratron tubes comprising a saturable core reactor having a control winding and a reactor winding, rectifier means in series-connected circuit with said reactor winding, with the grid of the corresponding thyratron tube and with a source of alternating voltage synchronous with said alternating current power supply, a grid-controlled amplifier tube having the control winding of said reactor and a source of alternating voltage synchronous with said alternating current power supply in series connected circuit with the anode and cathode thereof, the polarity of the circuit including the control winding being opposite to the polarity of the circuit including the reactor winding whereby current is supplied to said windings alternately in successive half-cycles of said alternating current supply to magnetize the core of said saturable core transformer in opposite directions in successive half-cycles, and means for impressing a direct control signal voltage between the grids of said amplifier tubes whereby the direction of rotation of said motor is determined by the polarity of said control signal and the torque thereof is determined by the magnitude of the control signal.

9. In a control circuit for a saturable core reactor having at least a control winding; a saturable core transformer including a primary and a secondary winding; an input circuit coupled to said primary winding, said input circuit having means permitting the flow of current in a single direction; rectifying means shunted across said control winding; an output circuit coupling said secondary winding and said control winding in series, and including means permitting the flow of current in only a single direction; and means supplying alternating potential to said input and said output circuits whereby the current flow in said output circuit during one half cycle of the alternating potential is determined by the current flow in said input circuit during the preceding half cycle.

10. The combination claimed in claim 9 wherein said control winding circuit is coupled to said potential supply means through a magnetizing transformer.

References Cited in the file of this patent

UNITED STATES PATENTS

| | | |
|---|---|---|
| 2,719,885 | Ramey | Oct. 4, 1955 |
| 2,747,109 | Montiner | May 2, 1956 |
| 2,783,315 | Ramey | Feb. 26, 1957 |
| 2,808,990 | Van Allen | Oct. 8, 1957 |